US010875939B2

(12) United States Patent
Nilsson et al.

(10) Patent No.: US 10,875,939 B2
(45) Date of Patent: Dec. 29, 2020

(54) POLYMER COMPOSITION COMPRISING A POLYOLEFIN PRODUCED IN A HIGH PRESSURE PROCESS, A HIGH PRESSURE PROCESS AND AN ARTICLE

(71) Applicant: Borealis AG, Vienna (AT)

(72) Inventors: Ulf Nilsson, Stenungsund (SE); Annika Smedberg, Myggenäs (SE); Alfred Campus, Eysins (CH); Achim Blok, Svanesund (SE); Björn Voigt, Hisings Backa (SE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/372,348

(22) Filed: Apr. 1, 2019

(65) Prior Publication Data

US 2020/0010583 A1  Jan. 9, 2020

Related U.S. Application Data

(63) Continuation of application No. 13/509,257, filed as application No. PCT/EP2010/066710 on Nov. 3, 2010, now Pat. No. 10,246,527.

(30) Foreign Application Priority Data

Nov. 11, 2009  (EP) ..................... 09175694

(51) Int. Cl.
| | |
|---|---|
| *C08F 10/00* | (2006.01) |
| *H01B 3/44* | (2006.01) |
| *C08F 110/02* | (2006.01) |
| *C08F 210/16* | (2006.01) |

(52) U.S. Cl.
CPC ............. *C08F 10/00* (2013.01); *H01B 3/441* (2013.01); *C08F 110/02* (2013.01); *C08F 210/16* (2013.01)

(58) Field of Classification Search
CPC ...... H01B 3/441; C08F 210/00; C08F 110/02; C08F 210/16; C08F 10/00
See application file for complete search history.

(56) References Cited

U.S. PATENT DOCUMENTS

| | | | |
|---|---|---|---|
| 3,098,893 A | 7/1963 | Pringle et al. | |
| 3,717,720 A | 2/1973 | Snellman | |
| 3,865,699 A * | 2/1975 | Luch | C25D 5/54 205/158 |
| 4,002,595 A * | 1/1977 | Adelman | C08K 3/04 524/492 |
| 4,038,042 A * | 7/1977 | Adelman | C08K 3/04 428/625 |
| 4,049,757 A | 9/1977 | Kammel et al. | |
| 4,169,816 A * | 10/1979 | Tsien | H01B 1/24 252/511 |
| 4,278,510 A * | 7/1981 | Chien | C08K 3/04 205/158 |
| 4,721,761 A * | 1/1988 | Omae | C08F 210/00 526/272 |
| 4,813,221 A | 3/1989 | Christian | |
| 4,855,360 A | 8/1989 | Duchesne et al. | |
| 5,246,783 A * | 9/1993 | Spenadel | H01B 3/441 174/110 R |
| 5,326,835 A | 7/1994 | Ahvenainen et al. | |
| 5,461,850 A | 10/1995 | Bryneel et al. | |
| 5,539,075 A * | 7/1996 | Gustafsson | C08F 210/02 526/279 |
| 5,554,826 A | 9/1996 | Gentry | |
| 5,556,697 A * | 9/1996 | Flenniken | C08K 3/04 174/105 SC |
| 5,661,965 A | 9/1997 | Yanagisawa | |
| 5,718,974 A | 2/1998 | Kmiec | |
| 5,718,994 A | 2/1998 | Goedeweeck et al. | |
| 5,731,082 A | 3/1998 | Gross et al. | |
| 5,822,973 A | 10/1998 | Kaneko et al. | |
| 5,852,135 A * | 12/1998 | Kanai | C08F 283/06 525/398 |
| 6,005,192 A | 12/1999 | Mashikian et al. | |
| 6,086,792 A | 7/2000 | Reid et al. | |
| 6,140,589 A | 10/2000 | Blackmore | |
| 6,184,319 B1 | 2/2001 | Hideki et al. | |

(Continued)

FOREIGN PATENT DOCUMENTS

| | | |
|---|---|---|
| DE | 1769723 A1 | 2/1972 |
| EP | 0 009 268 A1 | 4/1980 |

(Continued)

OTHER PUBLICATIONS

Andersson, J., et al., Comparison of Test Setups for High Field Conductivity of HVDC Insulation Materials, Nordic Insulation Symposium, Nord-IS 13, Trondheim, Norway, Jun. 9-12, 2013, 4 pages.
Bo, C., and Y. Yang, Laboratory Test, Sep. 30, 2015.
Bodega, R., Space Charge Accumulation in Polymeric High Voltage DC Cable Systems, Thesis, Technical University Delft, 2006, pp. vii-xii, 9-12, 75-89.
Certificate of Analysis, Certificate No. 232482, The Dow Chemical Company, Jun. 11, 2007, 4 pages.
Certificate of Analysis, Certificate No. 3783325, The Dow Chemical Company, Jul. 24, 2008, 4 pages.
Certificate of Analysis, Certificate No. 3802244, The Dow Chemical Company, Jul. 8, 2008, 4 pages.
Certificate of Analysis, Certificate No. 6022562, The Dow Chemical Company, Feb. 1, 2013, 2 pages.

(Continued)

*Primary Examiner* — Timothy J Thompson
*Assistant Examiner* — Rhadames Alonzo Miller
(74) *Attorney, Agent, or Firm* — Knobbe Martens Olson & Bear, LLP

(57) ABSTRACT

A method produces a polymer composition with improved DC electrical properties. A cable can be surrounded by at least one layer that includes the polymer composition. The polymer composition includes a polyolefin, and the polymer composition has an electric conductivity of $0.50 \times 10^{-15}$ S/m or less, when measured according to DC conductivity method using a tape sample consisting of the polymer composition.

17 Claims, No Drawings

(56) References Cited

U.S. PATENT DOCUMENTS

| | | | |
|---|---|---|---|
| 6,231,978 B1* | 5/2001 | Keogh | C08K 5/01 |
| | | | 174/110 PM |
| 6,302,175 B1 | 10/2001 | Shoyama | |
| 6,380,328 B1 | 4/2002 | McConville et al. | |
| 6,559,385 B1 | 5/2003 | Johnson et al. | |
| 6,930,149 B2 | 8/2005 | Haerkoenen et al. | |
| 7,473,742 B2 | 1/2009 | Easter | |
| 7,968,623 B2 | 6/2011 | Easter | |
| 8,831,389 B2 | 9/2014 | McCullough et al. | |
| 9,365,708 B2* | 6/2016 | Nilsson | C08F 6/001 |
| 9,587,043 B2 | 3/2017 | Nilsson et al. | |
| 9,595,374 B2 | 3/2017 | Nilsson et al. | |
| 2001/0030053 A1* | 10/2001 | Gadessaud | H01B 3/441 |
| | | | 174/102 SC |
| 2002/0001715 A1* | 1/2002 | Redondo | H01B 3/441 |
| | | | 428/375 |
| 2002/0022687 A1* | 2/2002 | Hikita | C08L 23/10 |
| | | | 524/528 |
| 2002/0034689 A1 | 3/2002 | Hoshida et al. | |
| 2002/0042451 A1 | 4/2002 | Sugaya | |
| 2002/0127401 A1* | 9/2002 | Perego | C08F 255/02 |
| | | | 428/375 |
| 2003/0017328 A1* | 1/2003 | Inoue | C09J 9/02 |
| | | | 428/328 |
| 2003/0149176 A1* | 8/2003 | Sekiguchi | C08L 23/0815 |
| | | | 525/70 |
| 2004/0108038 A1 | 6/2004 | Cordonnier et al. | |
| 2004/0138351 A1 | 7/2004 | Kaprinidis et al. | |
| 2004/0210002 A1* | 10/2004 | Haerkoenen | C08F 10/06 |
| | | | 525/192 |
| 2005/0031813 A1 | 2/2005 | Conrnette et al. | |
| 2005/0279074 A1 | 12/2005 | Johnson et al. | |
| 2006/0025734 A1 | 2/2006 | Flohr et al. | |
| 2006/0055075 A1 | 3/2006 | Hoshida et al. | |
| 2006/0102377 A1 | 5/2006 | Johnson et al. | |
| 2006/0116279 A1* | 6/2006 | Kogoi | B01J 21/063 |
| | | | 502/103 |
| 2006/0151758 A1* | 7/2006 | Reyes | C08K 5/34928 |
| | | | 252/601 |
| 2006/0191619 A1 | 8/2006 | Meersschaut et al. | |
| 2006/0235172 A1 | 10/2006 | Vestberg et al. | |
| 2006/0249705 A1* | 11/2006 | Wang | A61L 29/18 |
| | | | 252/62.51 C |
| 2007/0000682 A1 | 1/2007 | Varkey et al. | |
| 2007/0044992 A1 | 3/2007 | Bremnes | |
| 2007/0048472 A1 | 3/2007 | Krishnaswamy et al. | |
| 2007/0205009 A1 | 9/2007 | Figenschou | |
| 2007/0253778 A1 | 11/2007 | Figenschou | |
| 2007/0299173 A1* | 12/2007 | Wolfschwenger | C08L 23/12 |
| | | | 524/148 |
| 2008/0124521 A1* | 5/2008 | Niino | H01Q 17/004 |
| | | | 428/138 |
| 2008/0182935 A1 | 7/2008 | Smedberg et al. | |
| 2008/0227887 A1 | 9/2008 | Klier et al. | |
| 2008/0254289 A1 | 10/2008 | Bostrom et al. | |
| 2008/0315159 A1* | 12/2008 | Minagoshi | C08G 65/14 |
| | | | 252/500 |
| 2009/0045908 A1* | 2/2009 | Tanaka | H01C 7/027 |
| | | | 338/25 |
| 2009/0227717 A1 | 9/2009 | Smedberg et al. | |
| 2009/0238957 A1* | 9/2009 | Clancy | C08L 23/02 |
| | | | 427/117 |
| 2009/0280282 A1* | 11/2009 | Doty | B32B 1/08 |
| | | | 428/36.91 |
| 2010/0022715 A1* | 1/2010 | Grein | C08L 23/10 |
| | | | 525/221 |
| 2010/0025073 A1* | 2/2010 | Fagrell | C08L 23/0892 |
| | | | 174/120 SC |
| 2010/0038112 A1 | 2/2010 | Grether | |
| 2010/0059249 A1 | 3/2010 | Powers | |
| 2010/0086268 A1 | 4/2010 | Reyes | |
| 2010/0163269 A1* | 7/2010 | Perego | H01B 3/441 |
| | | | 174/107 |
| 2010/0181096 A1* | 7/2010 | Smedberg | C08K 5/0025 |
| | | | 174/120 SC |
| 2010/0222535 A1* | 9/2010 | Eaton | C08F 210/02 |
| | | | 526/348 |
| 2010/0293783 A1 | 11/2010 | Goldsworthy et al. | |
| 2010/0300592 A1 | 12/2010 | Miyazaki | |
| 2010/0319959 A1* | 12/2010 | Eaton | C08L 23/06 |
| | | | 174/110 SR |
| 2011/0042624 A1 | 2/2011 | Minagoshi | |
| 2011/0196078 A1 | 8/2011 | Wolfschwenger et al. | |
| 2011/0260343 A1 | 10/2011 | Burgoyne et al. | |
| 2012/0163758 A1 | 6/2012 | McCullough | |
| 2012/0170900 A1 | 7/2012 | Fancher et al. | |
| 2012/0273253 A1* | 11/2012 | Nilsson | C08F 6/001 |
| | | | 174/120 SC |
| 2012/0285722 A1 | 11/2012 | Nilsson et al. | |
| 2012/0298403 A1 | 11/2012 | Johnson et al. | |
| 2012/0305284 A1 | 12/2012 | Nilsson et al. | |
| 2013/0000947 A1 | 1/2013 | Smedberg et al. | |
| 2013/0199817 A1* | 8/2013 | Nilsson | C08L 23/06 |
| | | | 174/102 SC |
| 2013/0284486 A1 | 10/2013 | Nilsson et al. | |
| 2015/0291823 A1* | 10/2015 | Fu | C08K 3/36 |
| | | | 428/375 |
| 2017/0186515 A1 | 6/2017 | Nilsson et al. | |

FOREIGN PATENT DOCUMENTS

| | | |
|---|---|---|
| EP | 0 150 610 A2 | 8/1985 |
| EP | 0 463 402 A2 | 1/1992 |
| EP | 0 517 868 B1 | 11/1995 |
| EP | 0 688 794 B1 | 8/1998 |
| EP | 0 887 355 A1 | 12/1998 |
| EP | 1 168 469 A2 | 1/2002 |
| EP | 1 211 289 A1 | 6/2002 |
| EP | 0 810 235 B1 | 11/2004 |
| EP | 1 484 345 A1 | 12/2004 |
| EP | 1 574 772 | 9/2005 |
| EP | 1 341 826 | 3/2006 |
| EP | 1 669 403 A1 | 6/2006 |
| EP | 1 695 996 A1 | 8/2006 |
| EP | 1 927 626 | 6/2008 |
| EP | 1 927 627 | 6/2008 |
| EP | 1 950 241 | 7/2008 |
| EP | 1 731 564 B1 | 3/2010 |
| EP | 2 285 897 | 2/2011 |
| EP | 2 285 893 | 9/2011 |
| JP | 02018811 A | 1/1990 |
| JP | 2272031 A | 11/1990 |
| JP | H05-279578 | 10/1993 |
| JP | 05-062529 A | 12/1993 |
| JP | 05-298927 A | 12/1993 |
| JP | 06-251625 | 9/1994 |
| JP | H06-251624 A | 9/1994 |
| JP | 7021850 A | 1/1995 |
| JP | 08-059720 A | 3/1996 |
| JP | 09-306265 A | 11/1997 |
| JP | 10193468 | 7/1998 |
| JP | H10-259212 A | 9/1998 |
| JP | 10-283851 A | 10/1998 |
| JP | 11320651 | 11/1999 |
| JP | 2000-009265 | 1/2000 |
| JP | 2000-053815 A | 2/2000 |
| JP | 2001-040148 A | 2/2001 |
| JP | 2001-501660 A | 2/2001 |
| JP | 2006/6291002 A | 10/2006 |
| WO | WO 93/08222 A1 | 4/1993 |
| WO | WO 98/14537 A1 | 4/1998 |
| WO | WO 1998/014537 A1 | 4/1998 |
| WO | WO 99/20690 A1 | 4/1999 |
| WO | WO 99/40589 | 8/1999 |
| WO | WO 2000/01765 | 1/2000 |
| WO | WO 00/25324 A1 | 5/2000 |
| WO | WO 00/36612 | 6/2000 |
| WO | WO 01/37289 A1 | 5/2001 |
| WO | WO 01/053367 | 7/2001 |
| WO | WO 02/046297 A2 | 6/2002 |
| WO | WO 02/052582 A | 7/2002 |

(56) References Cited

FOREIGN PATENT DOCUMENTS

| | | |
|---|---|---|
| WO | WO 03/000754 A1 | 1/2003 |
| WO | WO 2004/041919 A2 | 5/2004 |
| WO | WO 2005/095838 | 10/2005 |
| WO | WO 2006/014852 | 2/2006 |
| WO | WO 2006/081400 A2 | 8/2006 |
| WO | WO 2006/089744 A1 | 8/2006 |
| WO | WO 2006/089793 A1 | 8/2006 |
| WO | WO 2006/131264 A1 | 12/2006 |
| WO | WO 2006/131266 A1 | 12/2006 |
| WO | WO 2008/070022 A1 | 6/2008 |
| WO | WO 2009/000326 A1 | 12/2008 |
| WO | WO 2009/002653 A1 | 12/2008 |
| WO | WO 2009/007116 A1 | 1/2009 |
| WO | WO 2009/007117 A1 | 1/2009 |
| WO | WO 2009/007118 A1 | 1/2009 |
| WO | WO 2009/007119 A1 | 1/2009 |
| WO | WO 2009/012041 A1 | 1/2009 |
| WO | WO 2009/012092 A1 | 1/2009 |
| WO | WO 2009/056409 A1 | 5/2009 |
| WO | WO 2010/003650 A1 | 1/2010 |
| WO | WO 2011/057926 A1 | 5/2011 |
| WO | WO 2011/057927 A1 | 5/2011 |

OTHER PUBLICATIONS

Chen, G., et al., AC Aging and Space-Charge Characteristics in Low-Density Polyethylene Polymeric Insulation, Journal of Applied Physics 97:083713-1-083713-7, 2015.
Commission Directive dated Aug. 6, 2002, Official Journal of the European Communities, pp. L 220/18-L 220/58.
Communication dated Aug. 19, 2015 for EP Application 10771773.8.
Communication of a Notice of Opposition dated Dec. 16, 2015 for EP 10771774.6.
Communication of a Notice of Opposition dated Oct. 19, 2015 for EP 10773622.5.
Declaration and Test Report on Carbon-Carbon Unsaturation of DXM-446 LDPE of Dr Timothy J. Person dated Dec. 8, 2015.
Declaration of Dr Timothy J. Person dated Oct. 6, 2015 with attachments including (1) the invoice 09/45106196 of Aug. 7, 2008, (2) the certificate of analysis 3802244 dated Aug. 7, 2008, (3) the invoice 09/45105512 of Jul. 24, 2008 and (4) the certificate of analysis 3783325 dated Jul. 24, 2008.
Declaration of Mr. Kent Neuvar with attachment dated Oct. 6, 2015 including MSDS Ideal EC 631.
Dow Chemical Pacific Limited Invoice No. 85/71201566 dated Jun. 10, 2007.
EP Communication Pursuant to Rule 114(2) dated Aug. 19, 2015 for Application No. EP 10771773.8 (Published as EP2499197).
Experimental report by Dr Dachao Li dated Oct. 6, 2015.
Final Office Action dated Mar. 27, 2015 for U.S. Appl. No. 13/509,268.
Final Office Action dated Sep. 17, 2014, 2014 for U.S. Appl. No. 13/509,256.
Ghorbani, H., Characterization of Conduction and Polarization Properties of HVDC Cable XLPE Insulation Materials, KTH School of Electrical Engineering, Licentiate Thesis, Stockholm, Sweden, Dec. 2015, 10 pages.
Ghorbani, H., Robust Characterization of the DC-Conductivity of HVDC Insulation Materials at High Electric Fields, 9th International Conference on Insulated Power Cables, Versailles, Jun. 21-25, 2015, 5 pages.
Global Advancements in HV Power Delivery Systems, May 12, 2017, 10 pages.
Global High Voltage Solutions, Dow Wire & Cable, Published Aug. 2008, The Dow Chemical Company.
Global High Voltage Solutions, Global Market Challenges and Opportunities, Dow Wire & Cable, May 12, 2017, 2 pages.
Ideal EC 631 Compressor Oil Material Safety Data Sheet, Feb. 5, 2008, 8 pages.

International Search Report and Written Opinion dated Dec. 9, 2010 for International Application No. PCT/EP2010/066710.
International Search Report and Written Opinion dated Dec. 6, 2010 for International Application No. PCT/EP2010/066711.
International Search Report and Written Opinion dated Dec. 2, 2010 for international Application No. PCT/EP2010/066712.
International Search Report and Written Opinion dated Nov. 30, 2010 for International Application No. PCT/EP2010/066709.
International Search Report and Written Opinion, International Application No. PCT/EP2009/066140 dated Feb. 5, 2010.
International Search Report and Written Opinion, International Application No. PCT/EP2009/009192, dated Apr. 27, 2010.
International Search Report dated Apr. 26, 2012 for International Application No. PCT/EP2011/069182.
International Search Report for PCT/EP2011/053025, dated Aug. 11, 2011.
International Search Report issued for PCT/EP2009/007783, dated Jan. 26, 2010.
International Search Report issued for PCT/EP2009/007784, dated Jan. 29, 2010.
International Search Report issued for PCT/EP2009/007785, dated Jan. 22, 2010.
International Search Report issued for PCT/EP2009/007786, dated Mar. 4, 2010.
Mazzanti, G., and M. Marzinotto, Extruded Cables for High-Voltage Direct-Current Transmission: Advances in Research and Development, IEEE Press, John Wiley & Sons, Inc., New Jersey, 2013, Chapter 3, Main Principles of HVDC Extruded Cable Design, p. 42.
Mobil Rarus PE KPL 201, https://www.mobil.com/English-IT/Industrial/pds/GLXXMobil-Rarus-PE-KPL-201?p=1, accessed Apr. 25, 2017, 3 pages.
Neuvar, K., Declaration Concerning Production of LDPE DXM 446 in Relation to EP 2,499,176 B1, Oct. 6, 2015, 1 page.
Office Action dated Apr. 10, 2014, for U.S. Appl. No. 13/509,256.
Office Action dated Aug. 25, 2014, for U.S. Appl. No. 13/509,268.
Office Action dated Dec. 5, 2013, for U.S. Appl. No. 13/509,268.
Office Action dated Feb. 25, 2015, for U.S. Appl. No. 13/509,252.
Office Action dated Jan. 29, 2015, for U.S. Appl. No. 13/509,256.
Office Action dated Jan. 5, 2015, for JP2013-537116.
Ohki, Y., et al., Electrical Conduction in Highly Resistive Polyolefin Films Modified by Polar Groups, Electrical Engineering in Japan 120(3):1113-1120, 1997.
Olsson et al., Experimental Determination of DC Conductivity for XPLE Insulation, Nordic Insulation Symposium 2009 (Nord-IS 09), Jun. 15, 2009, pp. 55-58.
Person, T., Experimental Report on Conductivity Tests of Various Polymers at 40kV/mm and 20C Related to EP 2,499,176 B1, Jan. 22, 2018.
Person, T.J., and D. Li, Supplemental Report of Conductivity Tests on Extruded Tape of DXM-446 at 20C and 40kV/mm, The Dow Chemical Company, Apr. 18, 2017.
Person, T.J., Comparison of 24-hour Conductivity Tests on XLPE Samples at 30kV/mm and 70C, The Dow Chemical Company, Apr. 18, 2017, 6 pages.
Person, T.J., Conductivity Tests of Various Polymers and Compositions for Opposition to EP 2,499,197 B1, Nov. 30, 2017, 2 pages.
Person, T.J., Declaration & Test Report on Carbon-Carbon Unsaturation of DXM-446 LDPE, Dec. 8, 2015, 4 pages.
Person, T.J., Declaration Concerning HFDB-4201 SC in Relation to EP 2,499,176 B1, Oct. 6, 2015, 2 pages.
Person, T.J., Experimental Test Report for Unsaturation in Various Unsaturated LDPE Copolymers and the Conductivity of Associated Polymer Compositions Related to EP 2,499,175B1, Dec. 13, 2017, 8 pages.
Primol 352 Product Information Sheet, Exxon Mobile Corp, Copyright 2001-2014, 3 pages.
Rudnick, L., and R. Shukbin, Synthetic Lubricants and High-performance Functional fluids, Revised and Expanded, CRC Press, 1999, p. 376-377.
Rule, et al., Macromolecules 38 (2005) 7266-7273.
Shamiri, et al., The influence of Ziegler-Natta and Metallocene Catalysts on Polyolefin Structure, Properties, and Processing Ability, Materials 7:5069-5108, 2014.

(56) References Cited

OTHER PUBLICATIONS

Shanghai Electric Cable Institute R&D Center, Polymer Insulation Sample, Test Report dated Nov. 26, 2015, 4 pages.
Shell Corena E 150, Technical Data Sheet, Feb. 13, 2007, 2 pages.
Smedberg, et al. Effect of Molecular Structure and Topology on Network Formation in Peroxide Crosslinked Polyethylene, Polymer 44:3395-3405, 2003.
Test Report on Preparing the Plaques for Electrical Conductivity Testing dated Dec. 7, 2015.
Test Report Shanghai Electric Cable Institute R&D Center—English Version.
The Dow Chemical Co, Invoice No. 327537, 1 page.
The Dow Chemical Co, Invoice No. 331206, 1 page.
The Dow Chemical Company Production Specification dated Jan. 24, 2009, 5 pages.
U.S. Appl. No. 13/509,252, including its prosecution history, the references and the Office Actions therein.
U.S. Appl. No. 13/509,256, including its prosecution history, the references and the Office Actions therein.
U.S. Appl. No. 13/509,268, including its prosecution history, the references and the Office Actions therein.
U.S. Appl. No. 13/883,271, including its prosecution history, the references and the Office Actions therein.

\* cited by examiner

POLYMER COMPOSITION COMPRISING A POLYOLEFIN PRODUCED IN A HIGH PRESSURE PROCESS, A HIGH PRESSURE PROCESS AND AN ARTICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates to a polymer composition comprising a polyolefin, a process for producing a polyolefin in a high pressure process and to an article, preferably a cable for wire or cable (W&C) applications, produced using the polymer composition, as well as the use of the polyolefin in power cable layer.

Description of the Related Art

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order.

Space Charge

There is a fundamental difference between AC and DC with respect to electrical field distribution in the cable. The electric field in an AC cable is easily calculated since it depends on one material property only, namely the relative permittivity (the dielectric constant) with a known temperature dependence. The electric field will not influence the dielectric constant. On the other hand, the electric field in a DC cable is much more complex and depends on the conduction, trapping and build-up of electric charges, so called space charges, inside the insulation. Space charges inside the insulation will distort the electric field and may lead to points of very high electric stress, possibly that high that a dielectric failure will follow. Preferably there should be no space charges present as it will make it possible to easily design the cable as the electric field distribution in the insulation will be known. Normally space charges are located close to the electrodes; charges of the same polarity as the nearby electrode are called homocharges, charges of opposite polarity are called heterocharges. The heterocharges will increase the electric field at this electrode, homocharges will instead reduce the electric field.

Electrical Conductivity

The DC electrical conductivity is an important material property e.g. for insulating materials for HV DC cables. First of all, the strong temperature and electric field dependence of this property will influence the electric field distribution via space charge build-up as described above. The second issue is the fact that heat will be generated inside the insulation by the electric leakage current flowing between the inner and outer semiconductive layers. This leakage current depends on the electric field and the electric conductivity of the insulation. High conductivity of the insulating material can even lead to thermal runaway under high stress/high temperature conditions. The conductivity must therefore be kept as low as possible to avoid thermal runaway.

Compressor Lubricants

HP process is typically operated at high pressures up to 4000 bar. In known HP reactor systems the starting monomer(s) need to be compressed (pressurised) before introduced to the actual high pressure polymerisation reactor. Compressor lubricants are conventionally used in the hypercompressor(s) for cylinder lubrication to enable the mechanically demanding compression step of starting monomer(s). It is well known that small amounts of the lubricant normally leaks through the seals into the reactor and mixes with the monomer(s). In consequence the reaction mixture contains traces (up to hundreds of ppm) of the compressor lubricant during the actual polymerisation step of the monomer(s). These traces of compressor lubricants can have an effect on the electrical properties of the final polymer. As examples of commercial compressor lubricants e.g. polyalkylene glycol (PAG): $R-[C_xR_yH_z-O]_n-H$, wherein R can be H or straight chain or branched hydrocarbyl and x, y, x, n are independent integers that can vary in a known manner, and lubricants based on a mineral oil (by-product in the distillation of petroleum) can be mentioned. Compressor lubricants which are based on mineral oils that meet the requirements set for the white mineral oil in European Directive 2002/72/EC, Annex V, for plastics used in food contact, are used e.g. for polymerising polymers especially for the food and pharmaceutical industry. Such mineral oil-based lubricants contain usually lubricity additive(s) and may also contain other type of additive(s), such as antioxidants.

WO2009012041 of Dow discloses that in high pressure polymerisation process, wherein compressors are used for pressurising the reactants, i.e. one or more monomer(s), the compressor lubricant may have an effect on the properties of the polymerised polymer. The document describes the use of a polyol polyether which comprises one or none hydroxyl functionality as a compressor lubricant for preventing premature crosslinking particularly of silane-modified HP polyolefins. WO2009012092 of Dow discloses a composition which comprises a HP (i) polyolefin free of silane functionality and (ii) a hydrophobic polyether polyol of PAG type wherein at least 50% of its molecules comprise no more than a single hydroxyl functionality. The component (ii) appears to originate from a compressor lubricant. The composition is i.a. for W&C applications and is stated to reduce dielectrical losses in MV and HV power cables, see page 2, paragraph 0006. In both applications it is stated that hydrophilic groups (e.g. hydroxyl groups) present in the compressor lubricant can result in increased water uptake by the polymer which in turn can increase electrical losses or, respectively, premature scorch, when the polymer is used as a cable layer material. The problems are solved by a specific PAG type of lubricant with reduced amount of hydroxyl functionalities.

There is a continuous need in the polymer field to find polymers which are suitable for demanding polymer applications such as wire and cable applications with high requirements and stringent regulations.

SUMMARY OF THE INVENTION

One of the objects of the present invention is to provide an alternative polymer composition which comprises a polyolefin with highly advantageous properties for use in a cable layer, preferably in a layer of an alternating current (AC) or direct current (DC) cable, more preferably in a layer of a DC cable.

A further object of the invention is to provide a process for polymerising a polyolefin in a high pressure reactor resulting in a polyolefin with highly advantageous properties for use in a cable layer, preferably in a layer of an AC or DC cable, more preferably in a layer of a DC cable.

Another object of the invention is to provide a power cable wherein at least one layer comprises a polymer composition comprising a polyolefin, which is preferably obtainable by a high pressure process and has highly advantageous properties for use in a cable layer, preferably in a layer of an AC or DC cable, more preferably in a layer of a DC cable.

Moreover, the invention provides a method for improving the electrical properties of a polymer composition comprising a polyolefin, which is preferably obtainable by a high pressure process.

The invention and further objects thereof are described and defined in details below.

DETAILED DESCRIPTION OF THE PREFERRED EMBODIMENT

The present invention provides a polymer composition comprising a polyolefin, wherein the polymer composition has an electric conductivity of $0.50 \times 10^{-15}$ S/m or less, when measured according to DC conductivity method using a tape sample consisting of the polymer composition as described below under "Determination Methods".

The polymer composition of the invention is also referred herein as "Polymer composition" or "polymer composition".

The unexpectedly low electrical conductivity of the Polymer composition is very advantageous i.a. for power cable applications and highly preferable for DC cable applications. The invention is particularly advantageous for DC power cables.

The polyolefin of the Polymer composition is preferably obtainable by a high pressure process.

As well known the high pressure reactor system typically comprises a compression zone for a) compressing one or more starting monomer(s) in one or more compressor(s) which are also known as hyper-compressor(s), a polymerisation zone for b) polymerising the monomer(s) in one or more polymerisation reactor(s) and a recovery zone for c) separating unreacted products in one or more separators and for recovering the separated polymer. Moreover, the recovery zone of the HP reactor system typically comprises a mixing and pelletising section, such as pelletising extruder, after the separator(s), for recovering the separated polymer in form of pellets. The process is described in more details below.

It has now surprisingly been found that when in a HP reactor system for compressing the starting monomer(s) a compressor lubricant comprising a mineral oil is used in compressors for cylinder lubrication, then the resulting polyolefin has highly advantageous electrical properties such as reduced, i.e. low, electrical conductivity which is preferably as defined above and below. This is unexpected, since mineral oils are conventionally used for producing polymers for medical and food industry, wherein health aspects are of concern, and not the reduced conductivity, as required for W&C applications.

Compressor lubricant means herein a lubricant used in compressor(s), i.e. in hypercompressor(s), for cylinder lubrication.

"Reduced" or "low" electrical conductivity as used herein interchangeably mean that the value obtained from the DC conductivity method is low, i.e. reduced.

Accordingly the polyolefin of the Polymer composition is preferably obtainable by a high pressure process comprising
(a) compressing one or more monomer(s) under pressure in a compressor, using a compressor lubricant for lubrication,
(b) polymerising a monomer optionally together with one or more comonomer(s) in a polymerisation zone,
(c) separating the obtained polyolefin from the unreacted products and recovering the separated polyolefin in a recovery zone,
wherein in step a) the compressor lubricant comprises a mineral oil.

The invention further provides method for reducing, i.e. providing low, electric conductivity of a Polymer composition comprising a polyolefin, wherein the method comprises the step of producing the polyolefin in a high pressure process comprising:
(a) compressing one or more monomer(s) under pressure in a compressor, using a compressor lubricant for lubrication,
(b) polymerising a monomer optionally together with one or more comonomer(s) in a polymerisation zone,
(c) separating the obtained polyolefin from the unreacted products and recovering the separated polyolefin in a recovery zone,
wherein in step a) a compressor lubricant is used which comprises a mineral oil.

A preferred embodiment of this method the electric conductivity of a polymer composition of a cable, preferably of a direct current (DC) power cable, comprising a conductor which is surrounded at least by an insulation layer, preferably at least by an inner semiconductive layer, an insulation layer and an outer semiconductive layer, is reduced by using the polymer composition of the invention for producing at least the insulation layer.

The invention further provides an article comprising the Polymer composition as defined above or below. The preferred article is a power cable, preferably a direct current (DC) power cable.

The invention thus further provides a power cable, preferably a direct current (DC) power cable, comprising a conductor surrounded by one or more layers, wherein at least one of said layer(s) comprises a polymer composition comprising a polyolefin which is obtainable by a high pressure polymerisation process comprising the steps of:
(a) compressing one or more monomer(s) under pressure in a compressor, using a compressor lubricant for lubrication,
(b) polymerising a monomer optionally together with one or more comonomer(s) in a polymerisation zone,
(c) separating the obtained polyolefin from the unreacted products and recovering the separated polyolefin in a recovery zone,
wherein in step a) the compressor lubricant comprises a mineral oil.

The expressions "obtainable by the process" or "produced by the process" are used herein interchangeably and mean the category "product by process", i.e. that the product has a technical feature which is due to the preparation process.

The invention also provides, independently from the above first cable, a second power cable, preferably direct current (DC) power cable, comprising a conductor surrounded by one or more layers, wherein at least one of said layer(s) comprises a polymer composition comprising a polyolefin, wherein the polymer composition has an electric conductivity of $0.50 \times 10^{-15}$ S/m or less, when measured according to DC conductivity method using a tape sample consisting of the polymer composition, as described below under "Determination Methods".

The first power cable and the second cable as defined above each form an independent invention. The unifying feature common to the first and second power cables is the reduced electrical conductivity of the Polymer composition which can be expressed by both means, i.e. by means of the electrical conductivity method or by means of "product-by-process".

The first and second power cable inventions are commonly referred herein as the Power cable. It is evident that the below preferred embodiments, subgroups and properties of the invention are generalisable and independent, i.e. can be combined in any combinations, and further describe the Polymer composition, the components thereof, the HP process, compressor lubricant and the first and second power cable inventions, i.e. the Power cable. Also the use of the Polymer composition for producing a power cable, preferably a direct current (DC) power cable, and a process for producing a power cable, preferably a direct current (DC) power cable are provided independently.

Compressor Lubricant

The compressor lubricant used in the polymerization process for producing the preferred polyolefin of the Polymer composition comprises mineral oil which is a known petroleum product.

Mineral oils have a well known meaning and are used i.a. for lubrication in commercial lubricants. "Compressor lubricant comprising a mineral oil" and "mineral oil-based compressor lubricants" are used herein interchangeably.

Mineral oil can be a synthetic mineral oil which is produced synthetically or a mineral oil obtainable from crude oil refinery processes.

Typically, mineral oil, known also as liquid petroleum, is a by-product in the distillation of petroleum to produce gasoline and other petroleum based products from crude oil. The mineral oil of the compressor lubricant of the invention is preferably a paraffinic oil. Such paraffinic oil is derived from petroleum based hydrocarbon feedstocks.

Mineral oil is preferably the base oil of the compressor lubricant. The compressor lubricant may comprise other components, such as lubricity additive(s), viscosity builders, antioxidants, other additive(s) or any mixtures thereof, as well known in the art.

More preferably, the compressor lubricant comprises a mineral oil which is conventionally used as compressor lubricants for producing plastics, e.g. LDPE, for food or medical industry, more preferably the compressor lubricant comprises a mineral oil which is a white oil. Even more preferably the compressor lubricant comprises white oil as the mineral oil and is suitable for the production of polymers for food or medical industry. White oil has a well known meaning. Moreover such white oil based compressor lubricants are well known and commercially available. Even more preferably the white oil meets the requirements for a food or medical white oil.

As, known, the mineral oil, preferably the white mineral oil of the preferred compressor lubricant contains paraffinic hydrocarbons.

Even more preferably, of the compressor lubricant meets one or more of the below embodiments:

In one preferable embodiment, the mineral oil, preferably the white mineral oil, of the compressor lubricant has a viscosity of at least $8.5 \times 10^{-6}$ m$^2$/s at 100° C.;

In a second preferable embodiment, the mineral oil, preferably the white mineral oil, of the compressor lubricant contains 5% per weight (wt %) or less of hydrocarbons with less than 25 carbon atoms;

In a third preferable embodiment, the hydrocarbons of the mineral oil, preferably of the white mineral oil, of the compressor lubricant have an average molecular weight (Mw) of 480 or more.

The above "amount of hydrocarbons", "viscosity" and "Mw" are preferably in accordance with the above European Directive 2002/72/EC of 6 Aug. 2002.

It is preferred that the compressor lubricant is according to each of the above three embodiments 1-3.

The most preferred compressor lubricant of the invention meets the requirements given for white mineral oil in European Directive 2002/72/EC of 6 Aug. 2002, Annex V, for plastics used in food contact. Directive is published e.g. in L 220/18 EN Official Journal of the European Communities 15 Aug. 2002. Accordingly the mineral oil is most preferably a white mineral oil which meets said European Directive 2002/72/EC of 6 Aug. 2002, Annex V. Moreover it is preferred that the compressor lubricant complies with said European Directive 2002/72/EC of 6 Aug. 2002.

The compressor lubricant of the invention can be a commercially available compressor lubricant or can be produced by conventional means, and is preferably a commercial lubricant used in high pressure polymerisation processes for producing plastics for medical or food applications. Non-exhaustive examples of preferable commercially available compressor lubricants are e.g. Exxcolub R Series compressor lubricant for production of polyethylene used in food contact and supplied i.a. by ExxonMobil, Shell Corena for producing polyethylene for pharmaceutical use and supplied by Shell, or CL-1000-SONO-EU, supplied by Sonneborn.

The compressor lubricant contains preferably no polyalkyleneglycol based components.

It is preferred that any mineral oil present in the Polymer composition of the invention originates from the compressor lubricant used in the process equipment during the polymerisation process of the polyolefin. Accordingly, it is preferred that no mineral oil is added to the Polymer composition or to the polyolefin after the polymerisation thereof.

Traces of the mineral oil originating from the compressor lubricant and present, if any, in the produced polyolefin would typically amount in maximum of up to 0.4 wt % based on the amount of the polyolefin. The given limit is the absolute maximum based on the calculation of the worst scenario where all the lost compressor lubricant (average leakage) would go to the final polyolefin. Such worst scenario is unlikely and normally the resulting polyolefin contains clearly lower level of the mineral oil.

The compressor lubricant of the invention is used in a conventional manner and well known to a skilled person for the lubrication of the compressor(s) in the compressing step (a) of the invention.

Polyolefin

The following preferable embodiments, properties and subgroups of the polyolefin component suitable for the Polymer composition are generalisable so that they can be used in any order or combination to further define the preferable embodiments of the Polymer composition.

The polyolefin of the Polymer composition is preferably produced in a high pressure process. The term polyolefin means both an olefin homopolymer and a copolymer of an olefin with one or more comonomer(s). As well known "comonomer" refers to copolymerisable comonomer units.

More preferably the polyolefin is a polyethylene produced in a high pressure process, more preferably a low density polyethylene (LDPE) polymer selected from LDPE homopolymer or LDPE copolymer of ethylene with one or more comonomer(s). The meaning of LDPE polymer is well known and documented in the literature. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

In case of polyolefin copolymer, preferably LDPE copolymer of ethylene, the one or more comonomer(s) may be selected from non-polar comonomer(s) or polar comonomer(s), or from any mixtures thereof, as well known.

As the polar comonomer, comonomer(s) containing hydroxyl group(s), alkoxy group(s), carbonyl group(s), carboxyl group(s), ether group(s) or ester group(s), or a mixture thereof, can used. More preferably, comonomer(s), if present, containing carboxyl and/or ester group(s) are used as said polar comonomer. Still more preferably, the polar comonomer(s) of the polyolefin, preferably of a LDPE copolymer of ethylene, is selected from the groups of acrylate(s), methacrylate(s) or acetate(s), or any mixtures thereof. If present in said polyolefin, preferably in a LDPE copolymer of ethylene, the polar comonomer(s) is preferably selected from the group of alkyl acrylates, alkyl methacrylates or vinyl acetate, or a mixture thereof. Further preferably, said polar comonomers are selected from C1- to C6-alkyl acrylates, C1- to C6-alkyl methacrylates or vinyl acetate. Still more preferably, said polyolefin, preferably a LDPE copolymer of ethylene, is a copolymer of ethylene with C1- to C4-alkyl acrylate, such as methyl, ethyl, propyl or butyl acrylate, or vinyl acetate, or any mixture thereof.

Non-polar comonomer means herein comonomer(s) which do not contain hydroxyl group(s), alkoxy group(s), carbonyl group(s), carboxyl group(s), ether group(s) or ester group(s). Preferred non-polar comonomer(s) are selected from the group comprising, preferably consisting of, mono-unsaturated (=one double bond) comonomer(s), preferably olefins, preferably alpha-olefins, more preferably $C_3$- to $C_{10}$-alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s), or any mixtures thereof. Polyunsaturated comonomer(s) are further described below under Process.

If the LDPE polymer is a copolymer, it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s).

The polyolefin, preferably a LDPE polymer, may optionally have an unsaturation which preferably originates from vinyl groups, vinylidene groups and trans-vinylene groups. The unsaturation can be provided by polymerizing monomer, preferably ethylene, in the presence of a chain transfer agent (CTA), which introduces double bonds, e.g. vinyl groups to the polymer chain, or in the presence of one or more polyunsaturated comonomer(s), as mentioned above, and optionally in the presence of a chain transfer agent which introduces e.g. vinyl groups to the polymer chain. The unsaturated polyolefins and the preferable unsaturated LDPE polymers are well known. The unsaturation level can be influenced by the selected polymerization conditions such as peak temperatures and pressure, as well known in the field.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

Typically, and preferably in W&C applications, the density of the ethylene homo- or copolymer as said polyolefin, preferably of a LDPE polymer, is higher than 0.860 g/cm$^3$. Preferably the density of the ethylene homo- or copolymer is not higher than 0.960 g/cm$^3$. The MFR$_2$ (2.16 kg, 190° C.) of the ethylene homo- or copolymer as said preferred polymer is preferably from 0.01 to 50 g/10 min, more preferably is from 0.1 to 20 g/10 min, and most preferably is from 0.2 to 10 g/10 min The preferred polyolefin of the invention is a LDPE homopolymer or LDPE copolymer as defined above, which may optionally be unsaturated. If the LDPE homopolymer is unsaturated, then the unsaturation is provided by a chain transfer agent (CTA) and/or by polymerization conditions. If the LDPE copolymer is unsaturated, then the unsaturation can be provided by one or more of the following means: by a chain transfer agent (CTA), by one or more polyunsaturated comonomer(s) and/or by polymerization conditions. In case of LDPE copolymer, it is preferably an unsaturated LDPE copolymer of ethylene with at least one polyunsaturated comonomer, preferably a diene, and optionally with other comonomer(s), such as polar comonomer(s) which is preferably selected from acrylate or acetate comonomer(s); more preferably an unsaturated LDPE copolymer of ethylene with a polyunsaturated comonomer, preferably a diene.

Process

The high pressure (HP) process is the preferred process for producing a polyolefin of the Polymer composition, preferably a low density polyethylene (LDPE) polymer selected from LDPE homopolymer or LDPE copolymer of ethylene with one or more comonomers. The invention further provides a process for polymerising a polyolefin in a high pressure process which comprises the steps of:

(a) compressing one or more monomer(s) under pressure in a compressor, wherein a compressor lubricant is used for lubrication, (b) polymerising a monomer optionally together with one or more comonomer(s) in a polymerisation zone(s), (c) separating the obtained polyolefin from the unreacted products and recovering the separated polyolefin in a recovery zone, wherein in step a) a compressor lubricant comprises a mineral oil including the preferable embodiments thereof.

Accordingly, the polyolefin of the invention is preferably produced at high pressure by free radical initiated polymerisation (referred to as high pressure radical polymerization). The preferred polyolefin is LDPE homopolymer or LDPE copolymer of ethylene with one or more comonomer(s), as defined above. The LDPE polymer obtainable by the process of the invention preferably provides the advantageous electrical properties as defined above or below. The high pressure (HP) polymerisation and the adjustment of process conditions for further tailoring the other properties of the polyolefin depending on the desired end application are well known and described in the literature, and can readily be used by a skilled person.

Compression Step a) of the Process of the Invention:

Monomer, preferably ethylene, with one or more optional comonomer(s), is fed to one or more compressor(s) or intensifiers at compressor zone to compress the monomer(s) up to the desired polymerization pressure and to enable handling of high amounts of monomer(s) at controlled temperature. Typical compressors, i.e. hyper-compressors, for the process can be piston compressors or diaphragm compressors. The compressor zone usually comprises several compressors that can work in series or in parallel. The compressor lubricant of the invention is used for cylinder lubrication in at least one, preferably in all of the hyper-compressor(s), present in the compressor zone. The compression step a) comprises usually 2-7 compression steps, often with intermediate cooling zones. Temperature is typically low, usually in the range of less than 200° C., preferably of less than 100° C. Any recycled monomer, preferably ethylene, and optional comonomer(s) can be added at feasible points depending on the pressure.

Polymerisation Step b) of the Process:

Preferred high pressure polymerisation is effected at a polymerisation zone which comprises one or more polymerisation reactor(s), preferably at least a tubular reactor or an autoclave reactor, preferably a tubular reactor. The polymerization reactor(s), preferably a tubular reactor, may comprise one or more reactor zones, wherein different polymerization conditions may occur and/or adjusted as well known in the HP field. One or more reactor zone(s) are provided in a known manner with means for feeding monomer and optional comonomer(s), as well as with means for adding initiator(s) and/or further components, such as CTA(s). Additionally, the polymerization zone may comprise a preheating section which is preceding or integrated to the polymerization reactor. In one preferable HP process the monomer, preferably ethylene, optionally together with one or more comonomer(s) is polymerized in a preferable tubular reactor, preferably in the presence of chain transfer agent(s).

Tubular Reactor:

The reaction mixture is fed to the tubular reactor. The tubular reactor may be operated as a single-feed system (also known as front feed), wherein the total monomer flow from the compressor zone is fed to the inlet of the first reaction zone of the reactor. Alternatively the tubular reactor may be a multifeed system, wherein e.g the monomer(s), the optional comonomer(s) or further component(s) (like CTA(s)) coming from the compression zone, separately or in any combinations, is/are split to two or more streams and the split feed(s) is introduced to the tubular reactor to the different reaction zones along the reactor. For instance 10-90% of the total monomer quantity is fed to the first reaction zone and the other 90-10% of the remaining monomer quantity is optionally further split and each split is injected at different locations along the reactor. Also the feed of initiator(s) may be split in two or more streams. Moreover, in a multifeed system the split streams of monomer(/comonomer) and/or optional further component(s), such as CTA, and, respectively, the split streams of initiator(s) may have the same or different component(s) or concentrations of the components, or both. The single feed system for the monomer and optional comonomer(s) is preferred in the tubular reactor for producing the polyolefin of the invention.

First part of the tubular reactor is to adjust the temperature of the feed of monomer, preferably ethylene, and the optional comonomer(s); usual temperature is below 200° C., such as 100-200° C. Then the radical initiator is added. As the radical initiator, any compound or a mixture thereof that decomposes to radicals at an elevated temperature can be used. Usable radical initiators, such as peroxides, are commercially available. The polymerization reaction is exothermic. There can be several radical initiator injections points, e.g. 1-5 points, along the reactor usually provided with separate injection pumps. As already mentioned also the monomer, preferably ethylene, and optional comonomer(s), is added at front and optionally the monomer feed(s) can be split for the addition of the monomer and/or optional comonomer(s), at any time of the process, at any zone of the tubular reactor and from one or more injection point(s), e.g. 1-5 point(s), with or without separate compressors.

Furthermore, one or more CTA(s) are preferably used in the polymerization process of the Polyolefin. Preferred CTA (s) can be selected from one or more non-polar and one or more polar CTA(s), or any mixtures thereof.

Non-polar CTA, if present, is preferably selected from i) one or more compound(s) which does not contain a polar group selected from nitrile (CN), sulfide, hydroxyl, alkoxy, aldehyl (HC=O), carbonyl, carboxyl, ether or ester group(s), or mixtures thereof. Non-polar CTA is preferably selected from one or more non-aromatic, straight chain branched or cyclic hydrocarbyl(s), optionally containing a hetero atom such as O, N, S, Si or P. More preferably the non-polar CTA(s) is selected from one or more cyclic alpha-olefin(s) of 5 to 12 carbon or one or more straight or branched chain alpha-olefin(s) of 3 to 12 carbon atoms, more preferably from one or more straight or branched chain alpha-olefin(s) of 3 to 6 carbon atoms. The preferred non-polar CTA is propylene.

The polar CTA, if present, is preferably selected from i) one or more compound(s) comprising one or more polar group(s) selected from nitrile (CN), sulfide, hydroxyl, alkoxy, aldehyl (HC=O), carbonyl, carboxyl, ether or ester group(s), or mixtures thereof;
ii) one or more aromatic organic compound(s), or
iii) any mixture thereof.

Preferably any such polar CTA(s) have up to 12 carbon atoms, e.g. up to 10 carbon atoms preferably up to 8 carbon atoms. A preferred option includes a straight chain or branched chain alkane(s) having up to 12 carbon atoms (e.g. up to 8 carbon atoms) and having at least one nitrile (CN), sulfide, hydroxyl, alkoxy, aldehyl (HC=O), carbonyl, carboxyl or ester group.

More preferably the polar CTA(s), if present, is selected from i) one or more compound(s) containing one or more hydroxyl, alkoxy, HC=O, carbonyl, carboxyl and ester group(s), or a mixture thereof, more preferably from one or more alcohol, aldehyde and/or ketone compound(s). The preferred polar CTA(s), if present, is a straight chain or branched chain alcohol(s), aldehyde(s) or ketone(s) having up to 12 carbon atoms, preferably up to 8 carbon atoms, especially up to 6 carbon atoms, most preferably, isopropanol (IPA), methylethylketone (MEK) and/or propionaldehyde (PA).

The amount of the preferable CTA(s) is not limited and can be tailored by a skilled person within the limits of the invention depending on the desired end properties of the final polymer. Accordingly, the preferable chain transfer agent(s) can be added in any injection point of the reactor to the polymer mixture. The addition of one or more CTA(s)

can be effected from one or more injection point(s) at any time during the polymerization.

In case the polymerization of the polyolefin is carried out in the presence of a CTA mixture comprising one or more polar CTA(s) as defined above and one or more non-polar CTA(s) as defined above, then the feed ratio by weight % of polar CTA to non-polar CTA is preferably 1 to 99 wt % of polar CTA and 1 to 99 wt % of non-polar CTA, based on the combined amount of the feed of polar CTA and the non-polar CTA into the reactor.

The addition of monomer, comonomer(s) and optional CTA(s) may include and typically includes fresh and recycled feed(s).

The reactor is continuously cooled e.g. by water or steam. The highest temperature is called peak temperature and the reaction starting temperature is called initiation temperature.

Suitable temperatures range up to 400° C., preferably from 80 to 350° C. and pressure from 700 bar, preferably 1000 to 4000 bar, more preferably from 1000 to 3500 bar. Pressure can be measured at least after compression stage and/or after the tubular reactor. Temperature can be measured at several points during all steps. High temperature and high pressure generally increase output. Using various temperature profiles selected by a person skilled in the art will allow control of structure of polymer chain, i.e. Long Chain Branching and/or Short Chain branching, density, branching factor, distribution of comonomers, MFR, viscosity, Molecular Weight Distribution etc.

The reactor ends conventionally with a valve a so-called production control valve. The valve regulates reactor pressure and depressurizes the reaction mixture from reaction pressure to separation pressure.

Recovering Step c) of the Process:

Separation:

The pressure is typically reduced to approx 100 to 450 bar and the reaction mixture is fed to a separator vessel where most of the unreacted, often gaseous, products are removed from the polymer stream. Unreacted products comprise e.g. monomer or the optional comonomer(s), and most of the unreacted components are recovered. The polymer stream is optionally further separated at lower pressure, typically less than 1 bar, in a second separator vessel where more of the unreacted products are recovered. Normally low molecular compounds, i.e. wax, are removed from the gas. The gas is usually cooled and cleaned before recycling.

Recovery of the Separated Polymer:

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the Polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

As to polymer properties, e.g. MFR, of the polymerised Polymer, preferably LDPE polymer, the properties can be adjusted by using e.g. chain transfer agent during the polymerisation, or by adjusting reaction temperature or pressure (which also to a certain extent have an influence on the unsaturation level).

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers, such as an $\alpha,\omega$-alkadienes, to increase the unsaturation of an ethylene copolymer. The non-reacted double bond(s) thus provides i.a. pendant vinyl groups to the formed polymer chain at the site, where the polyunsaturated comonomer was incorporated by polymerization. As a result the unsaturation can be uniformly distributed along the polymer chain in random copolymerisation manner. Also e.g. WO 9635732 describes high pressure radical polymerisation of ethylene and a certain type of polyunsaturated $\alpha,\omega$-divinylsiloxanes. Moreover, as known, e.g. propylene can be used as a chain transfer agent to provide said double bonds.

Polymer Composition

The Polymer composition of the invention may contain further components such as polymer component(s) and/or additive(s), preferably additive(s), such as antioxidant(s), free radical generating agent(s), such as crosslinking agent(s), e.g. organic peroxide(s), scorch retarder(s) (SR), crosslinking booster(s), stabiliser(s), processing aid(s), flame retardant additive(s), water tree retardant additive(s), acid scavenger(s), inorganic filler(s) and voltage stabilizer(s), as known in the polymer field.

The Polymer composition comprises preferably conventionally used additive(s) for W&C applications, such as one or more antioxidant(s) and optionally one or more scorch retarder(s), preferably at least one or more antioxidant(s). The used amounts of additives are conventional and well known to a skilled person, e.g. as already described above under "Description of the invention".

The Polymer composition of the invention comprises typically at least 50 wt %, preferably at least 60 wt %, more preferably at least 70 wt %, more preferably at least 75 wt %, more preferably from 80 to 100 wt % and more preferably from 85 to 100 wt %, of the polyolefin based on the total weight of the polymer component(s) present in the Polymer composition. The preferred Polymer composition consists of polyolefin as the only polymer component. The expression means that the Polymer composition does not contain further polymer components, but the polyolefin as the sole polymer component. However, it is to be understood herein that the Polymer composition may comprise further components other than polymer components, such as additive(s) which may optionally be added in a mixture with a carrier polymer, i.e. in so called master batch.

The Polymer composition has an electric conductivity of $0.50 \times 10^{-15}$ S/m or less, preferably of $0.48 \times 10^{-15}$ S/m or less, $0.40 \times 10^{-15}$ S/m or less, preferably $0.38 \times 10^{-15}$ S/m or less, when measured according to DC conductivity method using a tape sample consisting of the polymer composition, as described below under "Determination Methods". More preferably, e.g. in some demanding embodiments, the electric conductivity of the Polymer composition is more preferably of $0.35 \times 10^{-15}$ S/m or less, preferably $0.30 \times 10^{-15}$ S/m or less, or even as low as of $0.25 \times 10^{-15}$ S/m or less, depending on the end application, when measured according to DC conductivity method using a tape sample consisting of the polymer composition, as described below under "Determination Methods".

The Polymer composition preferably consist of the polyolefin, preferably polyethylene, more preferably LDPE homo or copolymer which may optionally be unsaturated, as the sole polymer component.

Preferably, the polyolefin provides the advantageous claimed electrical properties of the invention to the Polymer composition. Accordingly, the polyolefin, preferably polyethylene, more preferably LDPE homo or copolymer which may optionally be unsaturated, of the Polymer composition has an electric conductivity of $0.50 \times 10^{-15}$ S/m or less, preferably of $0.48 \times 10^{-15}$ S/m or less, $0.40 \times 10^{-15}$ S/m or less, preferably of $0.38 \times 10^{-15}$ S/m or less, when measured according to DC conductivity method using a tape sample consisting of the polyolefin polymer, as described below under "Determination Methods". More preferably, e.g. in some demanding embodiments, the electric conductivity of the polyolefin, preferably polyethylene, more preferably the optionally unsaturated LDPE homo or copolymer, is more preferably of $0.35 \times 10^{-15}$ S/m or less, preferably $0.30 \times 10^{-15}$ S/m or less, or even as low as of $0.25 \times 10^{-15}$ S/m or less, depending on the end application, when measured according to DC conductivity method using a tape sample consisting of the polyolefin polymer, as described below under "Determination Methods".

The lower limit of the electric conductivity of the Polymer composition, or, preferably, of the polyolefin is not limited and can be e.g. $0.0001 \times 10^{-15}$ S/m or more, such as $0.001 \times 10^{-15}$ S/m, when measured from a tape sample according to said DC conductivity method.

Moreover, the Polymer composition with advantageous electrical properties can be crosslinked. Accordingly, one preferred Polymer composition of the invention is crosslinkable. It is preferably used for crosslinkable cable applications which are subsequently crosslinked. Crosslinking can be effected i.a. by radical reaction using radiation or free radical generating agent(s), also called crosslinking agent(s), which both terms are interchangeably used herein. Examples of such free radical generating agents are peroxides including inorganic and organic peroxide(s). A further well known crosslinking method is crosslinking via functional groups, e.g. by hydrolysing hydrolysable silane groups, which are attached (either via copolymerisation or via grafting) to polymer, and subsequently condensing the formed silanol groups using a silanol condensation catalyst.

Crosslinking is preferably effected by free radical generating agent(s) which contain(s) at least one —O—O— bond or at least one —N=N— bond. More preferably, the free radical generating agent is a peroxide, whereby the crosslinking is preferably effected using a well known peroxide crosslinking technology that is based on free radical crosslinking and is well known in the field. The peroxide can be any suitable peroxide, e.g. such as conventionally used in the field.

End Uses and End Applications of the Invention

The new Polymer composition of the invention is highly useful in wide variety of end applications of polymers. The preferred use of the Polymer composition is in W&C applications, more preferably in one or more layers of a power cable.

A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables, especially for power cables operating at voltages higher than 6 kV to 36 kV (known as medium voltage (MV) cables) and power cables operating at voltages higher than 36 kV, known as high voltage (HV) cables and extra high voltage (EHV) cables, which EHV cables operate, as well known, at very high voltages. The terms have well known meanings and indicate the operating level of such cables. For HV and EHV DC power cables the operating voltage is defined herein as the electric voltage between ground and the conductor of the high voltage cable. HV DC power cable and EHV DC power cable can operate e.g. at voltages of 40 kV or higher, even at voltages of 50 kV or higher. EHV DC power cables operate at very high voltage ranges e.g as high as up to 800 kV, however without limiting thereto.

The Polymer composition with advantageous DC conductivity properties is thus highly suitable for direct current (DC) power cables operating at any voltages, preferably at higher than 36 kV, such as HV or EHV DC power cables, as defined above.

In addition to reduced electrical conductivity, the Polymer composition has preferably also very good space charge properties which are advantageous for power cables, particularly for DC power cables.

The invention further provides the use of the polyolefin of the invention, which is obtainable by the high pressure (HP) process of the invention, for producing a power cable, preferably a DC power cable. Also the use of a polyolefin which is obtainable by the HP process of the invention in at least one layer, preferably at least in an insulation layer, of a DC power cable is provided. Naturally the polyolefin is used in the polymer composition of the invention.

The first independent Power cable, preferably a direct current (DC) power cable, comprises a conductor surrounded by one or more layers, wherein at least one of said layer(s) comprises a polymer composition comprising a polyolefin as defined above which is obtainable by a high pressure polymerisation process comprising the steps of:

(a) compressing one or more monomer(s) under pressure in a compressor, wherein a compressor lubricant is used for lubrication, (b) polymerising a monomer optionally together with one or more comonomer(s) in a polymerisation zone, (c) separating the obtained polyolefin from the unreacted products and recovering the separated polyolefin in a recovery zone, wherein in step a) a compressor lubricant comprises a mineral oil as defined above.

The second independent Power cable, preferably a direct current (DC) power cable, comprises a conductor surrounded by one or more layers, wherein at least one of said layer(s) comprises a polymer composition comprising a polyolefin as defined above, wherein the polymer composition, preferably the polyolefin, has an electric conductivity of $0.50 \times 10^{-15}$ S/m or less, preferably of $0.48 \times 10^{-15}$ S/m or less, preferably of $0.40 \times 10^{-15}$ S/m or less, more preferably $0.38 \times 10^{-15}$ S/m or less, when measured according to DC conductivity method using a tape sample consisting of the polymer composition, or respectively the polyolefin, as described below under "Determination Methods". More preferably, the polymer composition of the power cable has the electric conductivity of $0.35 \times 10^{-15}$ S/m or less, preferably of $0.30 \times 10^{-15}$ S/m or less, or even as low as of $0.25 \times 10^{-15}$ S/m or less, when measured according to DC conductivity method using a tape sample consisting of the polymer composition, as described below under "Determination Methods".

The preferred Power cable, preferably a direct current (DC) Power cable, comprises a conductor surrounded by one or more layers, wherein at least one of said layer(s) comprises a polymer composition comprising a polyolefin, wherein
i) the polymer composition, preferably the polyolefin, has an electric conductivity of $0.50 \times 10^{-15}$ S/m or less, preferably of $0.48 \times 10^{-15}$ S/m or less, $0.40 \times 10^{-15}$ S/m or less, preferably of $0.38 \times 10^{-15}$ S/m or less, when measured according to DC conductivity method using a tape sample consisting of the polymer composition, or, respectively, of the polyolefin polymer, as described below under "Determination Methods", more preferably, the polymer composition, preferably the polyolefin, of the power cable has the electric conductivity of $0.35 \times 10^{-15}$ S/m or less, preferably of $0.30 \times 10^{-15}$ S/m or less, or even as low as of $0.25 \times 10^{-15}$ S/m or less, when measured according to DC conductivity method using a tape sample consisting of the polymer composition, or, respectively, of the polyolefin polymer, as described below under "Determination Methods",
and wherein the polyolefin is obtainable by a high pressure polymerisation process comprising the steps of:
(a) compressing one or more monomer(s) under pressure in a compressor, wherein a compressor lubricant is used for lubrication,
(b) polymerising a monomer optionally together with one or more comonomer(s) in a polymerisation zone,
(c) separating the obtained polyolefin from the unreacted products and recovering the separated polyolefin in a recovery zone,
wherein in step a) a compressor lubricant comprises a mineral oil as defined above.

The preferred properties and embodiments of the compressor lubricant, HP process and components of the Polymer composition of the Power cable are as defined above, below or in claims.

The term "conductor" means herein above and below that the conductor comprises one or more wires. Moreover, the cable may comprise one or more such conductors. Preferably the conductor is an electrical conductor and comprises one or more metal wires.

In one preferable embodiment of the Power cable of the invention, the at least one layer is an insulation layer which comprises said polymer composition of the invention. It is generally known that insulation layers have high requirements for electrical properties.

In a preferred embodiment, the Power cable is a DC cable, which comprises at least an inner semiconductive layer, insulation layer and an outer semiconductive layer, in that order, wherein at least one of said layers, preferably at least the insulation layer, comprises said Polymer composition as defined above or in claims.

As well known the cable can optionally comprise further layers, e.g. layers surrounding the insulation layer or, if present, the outer semiconductive layers, such as screen(s), a jacketing layer(s), other protective layer(s) or any combinations thereof.

More preferably the Power cable is crosslinkable and is crosslinked before the end use application.

The invention also provides a process for producing a Power cable, preferably a crosslinkable Power cable, more preferably a crosslinkable DC Power cable, comprising steps of applying, preferably by (co)extrusion, one or more layers on a conductor wherein at least one layer comprises said polymer composition of the invention as defined in terms of product-by-process according to the first cable invention or in terms of electrical conductivity according to the second cable invention, preferably in terms of product-by-process and electrical conductivity.

The power cable production process of the invention is preferably carried out by
providing the Polymer composition of the invention as defined above or below in claims,
mixing, preferably meltmixing in an extruder, the Polymer composition optionally together with further component(s), such as further polymer component(s) and/or additive(s),
applying a meltmix of the Polymer composition obtained from the previous step, preferably by (co)extrusion, on a conductor to form one or more layers, wherein at least one layer comprises said polymer composition of the invention, and
optionally crosslinking at least the layer comprising said polymer composition of the invention Melt mixing means mixing above the melting point of at least the major polymer component(s) of the obtained mixture and is typically carried out in a temperature of at least 10-15° C. above the melting or softening point of polymer component(s).

Preferably, said Polymer composition is used in form of powder, grain or pellets when provided to the cable production process. Pellets can be of any size and shape and can be prepared by any conventional pelletising method using any conventional pelletising device, such as pelletising extruder.

The polymer composition may thus contain additive(s) such as additive(s) conventionally used in W&C polymer applications. Part or all of the optional additive(s) can be added e.g. to the polyolefin before the above preferable pellet formation to obtain the Polymer composition. As an alternative, part or all of the optional additive(s) can be added to the Polymer composition after the preferable pelletisation step and optionally the Polymer composition is then further pelletised before the use in cable preparation process. Also alternatively, part or all of the optional additive(s) can be added to the Polymer composition in connection with the preparation process of a cable thereof. The additive(s) may be used in conventional amounts. In the preferred embodiment the polymer composition of the invention is provided to the cable production process in a form of premade pellets.

The processing temperatures and devices are well known in the art, e.g. conventional mixers and extruders, such as single or twins screw extruders, are suitable for the process of the invention.

It is preferred that the meltmix of the Polymer composition obtained from meltmixing step consists of the polyolefin of the invention as the sole polymer component. The optional, and preferable, additive(s) can be added to Polymer composition as such or as a mixture with a carrier polymer, i.e. in a form of so-called master batch.

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance triple extrusion can be used for forming three cable layers.

More preferably the at least one layer comprising the Polymer composition of obtained Power cable is crosslinkable and crosslinked by a free radical generating agent.

"Crosslinkable" means that the cable layer is crosslinked before the use in the end application thereof. In crosslinking reaction of a polymer i.a. interpolymer crosslinks (bridges) are primarily formed.

The free radical generating agent, preferably a peroxide, can be present in the Polymer composition, e.g. in the pellets, before it is provided to the cable production process or the free radical generating agent can be added to Polymer composition in connection to the cable production line. The crosslinking can be carried out in an elevated temperature in a manner known in the art.

The crosslinking step may be carried out in connection with the production line of the Power cable as a subsequent step and optionally in a different equipment following the cable formation equipment, whereafter the crosslinked article is recovered.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

Molecular Weight

The Mz, Mw, Mn, and MWD are measured by Gel Permeation Chromatography (GPC) for low molecular weight polymers as known in the field.

Comonomer Contents a) Quantification of alpha-olefin content in linear low density polyethylenes and low density polyethylenes by NMR spectroscopy:

The comonomer content was determined by quantitative 13 C nuclear magnetic resonance (NMR) spectroscopy after basic assignment (J. Randall JMS—Rev. Macromol. Chem. Phys., C29(2&3), 201-317 (1989)). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13 C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer content of polar comonomers in low density polyethylene (1) Polymers containing >6 wt. % polar comonomer units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt % Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate}-A_{2475}$). Then the maximum absorbance peak for the polyethylene peak at 2660 $cm^{-1}$ was subtracted with the absorbance value for the base line at 2475 $cm^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of copolymer content in polymers by NMR spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers containing 6 wt. % or less polar comonomer units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{21850}$). Then the maximum absorbance peak for polyethylene peak at 2660 cm$^{-1}$ was subtracted with the absorbance value for the base line at 1850 cm$^{-1}$ ($A_{2660}-A_{1850}$. The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1). The weight-% can be converted to mol-% by calculation. It is well documented in the literature.

Electric Conductivity Measurement Procedure on Tape Samples

Tape Sample:

A Collin Teach-Line E 20T extruder is used to make the tape of thickness 0.15 mm A die specially designed for tape extrusion is used: The opening is 100 mm wide and 0.35 mm high.

Set Temperatures:

Zon 1: 60° C.
Zon 2: 115° C.
Zon 3: 120° C.
Zon 4: 125° C.
Zon 5: 125° C. (the die)
Screw speed: 30 rpm.
Line speed: 1 m/min.

The tape samples consisted of the test polymer composition, or in the preferable embodiment of the polyolefin. In the below examples the polyolefin base resin was used without any additives.

Prior to measurements the tapes were conditioned in 50° C. oven at 1 atm for 120 hours. Conduction current measurements are performed by a three-terminal cell, in nitrogen at a pressure of 3 bar and temperature at 20° C. Specimens are tested with gold-coated electrodes obtained by cold sputtering. The low voltage electrode has a diameter of 25 mm (measurement area is thus 490 mm$^2$). A guard electrode is situated around, but separated from the low voltage electrode. The high voltage electrode has a diameter of 50 mm, the same dimension of the external diameter of the guard electrode.

A DC voltage (U) equal to target electric stress (E) x measured tape thickness (d) is applied on the high voltage electrode. The current through the tape between the high voltage and the low voltage electrode is measured with an electrometer. The measurements are terminated when the current has reached a steady-state level, normally after 24-48 hours. The reported conductivity σ (S/m) is calculated from the steady-state current (I) by the equation σ=$I/(A\times E)$ where A is the cross-section, in this case 490 mm$^2$, and E is the electric stress, in this case 40 kV/mm Experimental Part Preparation of Polymers of the Examples of the Present Invention and the Comparative Example All polymers were low density polyethylenes produced in a high pressure reactor. The production of inventive and comparative polymers is described below:

In the below measurements, such as density, MFR and electrical properties, of the inventive and comparative examples, polymer composition where used which consisted of the polyolefin base resin without any additives. As to CTA feeds, e.g. the PA content can be given as liter/hour or kg/h and converted to either units using a density of PA of 0,807 kg/liter for the recalculation.

Inventive Composition 1

Ethylene with recycled CTA was liquefied by compression and cooling to a pressure of 90 bar and a temperature of –30° C. and split up into to two equal streams of roughly 15-16 tons/hour each. The CTA (methyl ethyl ketone (MEK)), air and a commercial peroxide radical initiator dissolved in a solvent were added to the two liquid ethylene streams in individual amounts. The two mixtures were separately pumped through an array of 4 intensifiers to reach pressures of 2200-2300 bar and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 215 m for zone 1 and 38 mm and 480 m for zone 2. MEK was added in amounts of 113 kg/h to the front stream to maintain a MFR$_2$=1.8 g/10 min. The front feed stream was passed through a heating section to reach a temperature sufficient for the exothermal polymerization reaction to start. The reaction reached peak temperatures of 250° C. and 321° C. in the first and second zones, respectively. The side feed stream cooled the reaction to an initiation temperature of the second zone of 167° C. Air and peroxide solution was added to the two streams in enough amounts to reach the target peak temperatures. The reaction mixture was depressurized by a product valve, cooled and polymer was separated from unreacted gas.

Inventive composition 2

Purified ethylene was liquefied by compression and cooling to a pressure of 90 bar and a temperature of –30° C. and split up into to two equal streams of roughly 14 tons/hour each. The CTA (methyl ethyl ketone (MEK)), air and a commercial peroxide radical initiator dissolved in a solvent were added to the two liquid ethylene streams in individual amounts. The two mixtures were separately pumped through an array of 4 intensifiers to reach pressures of 2300 bar and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of 189 kg/h to the front stream to maintain a MFR$_2$=0.74 g/10 min. The front feed stream was passed through a heating section to reach a temperature sufficient for the exothermal polymerization reaction to start. The reaction reached peak temperatures of 245° C. and 324° C. in the first and second zones, respectively. The side feed stream cooled the reaction to an initiation temperature of the second zone of 165° C. Air and peroxide solution was added to the two streams in enough amounts to reach the target peak temperatures. The reaction mixture was depressurized by a product valve, cooled and polymer was separated from unreacted gas.

Inventive Composition 3

Ethylene with recycled CTA was compressed in a 5-stage precompressor and a 2-stage hyper compressor with intermediate cooling to reach initial reaction pressure of ca 2600 bar. The total compressor throughput was ca 30 tons/hour. In the compressor area approximately 4.2 kg/hour of propion aldehyde (PA, CAS number: 123-38-6) was added together with approximately 98 kg propylene/hour as chain transfer agents to maintain an MFR of 2.1 g/10 min. Here also 1,7-octadiene was added to the reactor in amount of 25 kg/h. The compressed mixture was heated to 165° C. in a preheating section of a front feed two-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 281° C. after which it was cooled to approximately 203° C. The subsequent $2^{nd}$ peak reaction temperature was 274° C. The reaction mixture was depressurised by a kick valve, cooled and polymer was separated from unreacted gas.

Inventive Composition 4

Ethylene with recycled CTA was compressed in a 5-stage precompressor and a 2-stage hyper compressor with intermediate cooling to reach initial reaction pressure of ca 2600 bar. The total compressor throughput was ca 30 tons/hour. In the compressor area approximately 150 kg propylene/hour was added as chain transfer agents to maintain an MFR of 2.3 g/10 min. The compressed mixture was heated to 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 284° C. after which it was cooled to approximately 208° C. The subsequent $2^{nd}$ and $3^{rd}$ peak reaction temperatures were 274° C. and 268° C. respectively, with a cooling in between down to 238° C. The reaction mixture was depressurised by a kick valve, cooled and polymer was separated from unreacted gas.

Inventive Composition 5

Ethylene with recycled CTA was compressed in a 5-stage precompressor and a 2-stage hyper compressor with intermediate cooling to reach initial reaction pressure of ca 2600 bar. The total compressor throughput was ca 30 tons/hour. In the compressor area approximately 14.3 kg/hour of propion aldehyde (PA) was added as chain transfer agent to maintain an MFR of 2.05 g/10 min. The compressed mixture was heated to 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 305° C. after which it was cooled to approximately 208° C. The subsequent $2^{nd}$ and $3^{rd}$ peak reaction temperatures were 286° C. and 278° C. respectively, with a cooling in between down to 237° C. The reaction mixture was depressurised by a kick valve, cooled and polymer was separated from unreacted gas.

Inventive Composition 6

Ethylene with recycled CTA was compressed in a 5-stage precompressor and a 2-stage hyper compressor with intermediate cooling to reach initial reaction pressure of ca 2600 bar. The total compressor throughput was ca 30 tons/hour. In the compressor area approximately 2.8 kg/hour of propion aldehyde (PA) was added together with approximately 93 kg propylene/hour as chain transfer agents to maintain an MFR of 1.9 g/10 min. The compressed mixture was heated to 165° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 280° C. after which it was cooled to approximately 211° C. The subsequent $2^{nd}$ and $3^{rd}$ peak reaction temperatures were 282° C. and 260° C. respectively, with a cooling in between down to 215° C. The reaction mixture was depressurised by a kick valve, cooled and polymer was separated from unreacted gas.

Inventive Composition 7

Ethylene with recycled CTA was compressed in a 5-stage precompressor and a 2-stage hyper compressor with intermediate cooling to reach initial reaction pressure of ca 2700 bar. The total compressor throughput was ca 30 tons/hour. In the compressor area approximately 3.6 kg/hour of propion aldehyde (PA) was added together with approximately 78 kg propylene/hour as chain transfer agents to maintain an MFR of 1.9 g/10 min. Here also 1,7-octadiene was added to the reactor in amount of 30 kg/h. The compressed mixture was heated to 159° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 285° C. after which it was cooled to approximately 220° C. The subsequent $2^{nd}$ and $3^{rd}$ peak reaction temperatures were 275° C. and 267° C. respectively, with a cooling in between down to 240° C. The reaction mixture was depressurised by a kick valve, cooled and polymer was separated from unreacted gas.

Reference Composition 1

Purified ethylene was liquefied by compression and cooling to a pressure of 90 bar and a temperature of −30° C. and split up into to two equal streams of roughly 14 tons/hour each. The CTA (nonene), air and a commercial peroxide radical initiator dissolved in a solvent were added to the two liquid ethylene streams in individual amounts. The two mixtures were separately pumped through an array of 4 intensifiers to reach pressures of 2000-2200 bar and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. Nonene was added in amounts of 146 kg/h to the front stream to maintain a $MFR_2$=0.26 g/10 min. The front feed stream was passed through a heating section to reach a temperature sufficient for the exothermal polymerization reaction to start. The reaction reached peak temperatures of 271° C. and 304° C. in the first and second zones, respectively. The side feed stream cooled the reaction to an initiation temperature of the second zone of 162° C. Air and peroxide solution was added to the two streams in enough amounts to reach the target peak temperatures. The reaction mixture was depressurized by a product valve, cooled and polymer was separated from unreacted gas.

Reference Composition 2

Purified ethylene was liquefied by compression and cooling to a pressure of 90 bar and a temperature of −30° C. and split up into to two equal streams of roughly 14 tons/hour each. The CTA (methyl ethyl ketone (MEK)), air and a commercial peroxide radical initiator dissolved in a solvent were added to the two liquid ethylene streams in individual amounts. The two mixtures were separately pumped through an array of 4 intensifiers to reach pressures of 2100-2200 bar and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of 180 kg/h to the front stream to maintain a MFR$_2$=0.71 g/10 min. The front feed stream was passed through a heating section to reach a temperature sufficient for the exothermal polymerization reaction to start. The reaction reached peak temperatures of 256° C. and 305° C. in the first and second zones, respectively. The side feed stream cooled the reaction to an initiation temperature of the second zone of 168° C. Air and peroxide solution was added to the two streams in enough amounts to reach the target peak temperatures. The reaction mixture was depressurized by a product valve, cooled and polymer was separated from unreacted gas.

Density

| Example | Density (kg/m$^3$) |
|---|---|
| Inventive Composition 1 | 922 |
| Inventive Composition 2 | 922 |
| Inventive Composition 3 | 923 |
| Inventive Composition 4 | 920 |
| Inventive Composition 5 | 923 |
| Inventive Composition 6 | 922 |
| Inventive Composition 7 | 922 |
| Reference Composition 1 | 920 |
| Reference Composition 2 | 923 |

Data and results on the electrical testing:

DC Conductivity Test

The sample preparation and determination method were carried out as described under "Electric Conductivity measurement procedure on tape samples".

Also the compression lubricant (commercially available products) and chain transfer agent (CTA) used for producing the inventive and comparative LDPEs are identified in table 1. The inventive polymer compositions (Inv Composition) and Reference polymer compositions (RE Composition) consisted of the corresponding LDPE prepared in the above examples. No additives were added.

TABLE 1

Electric conductivity results

| Composition examples no. | Compressor lubricant | Electric conductivity (10$^{-15}$ S/m) - tape consisting of polyolefin base resin |
|---|---|---|
| RE Composition 1 | Klueber Syntheso D 201N, PAG-based lubricant supplied by Klueber | 1.12 |
| Inv Composition 1 | MO 200, Mineral oil-based lubricant supplied by Hansen & Rosenthal | 0.20 |
| RE Composition 2 | Klueber Syntheso D 201N, PAG-based lubricant supplied by Klueber | 2.05 |
| Inv Composition 2 | MO 200, Mineral oil-based lubricant supplied by Hansen & Rosenthal | 0.30 |
| Inv Composition 3 | Shell Corena E 150, Mineral oil-based lubricant supplied by Shell | 0.15 |
| Inv Composition 4 | Shell Corena E150, Mineral oil-based lubricant supplied by Shell | 0.35 |
| Inv Composition 5 | Shell Corena E150, Mineral oil-based lubricant supplied by Shell | 0.30 |
| Inv Composition 6 | Shell Corena E150, Mineral oil-based lubricant supplied by Shell | 0.23 |
| Inv Composition 7 | M-RARUS PE KPL 201, Mineral oil supplied by ExxonMobil | 0.092 |

"Mineral oil-based" means that contains also additives not specified by product supplier. The data in Table 2 demonstrate the importance of type of compressor lubricant on the DC electric conductivity of the polyolefin tape samples. A very low DC conductivity value gives an improved performance. Excellent low values are achieved with the use of mineral oil-based compressor lubricants compared to PAG lubricants in the high pressure process.

What is claimed is:

1. A polymer composition comprising a polyolefin, wherein the polymer composition has an electric conductivity of 0.50×10$^{-15}$ S/m or less, when measured according to DC conductivity method using a tape sample consisting of the polymer composition as described under "Determination Methods";
wherein the polyolefin is a low density polyethylene (LDPE) selected from a LDPE homopolymer or LDPE copolymer of ethylene with one or more comonomer(s), which LDPE homopolymer or LDPE copolymer of ethylene may optionally be unsaturated, and wherein said polyolefin is produced in a high pressure process comprising:
(a) compressing one or more monomer(s) under pressure in a compressor, wherein a compressor lubricant is used for lubrication,
(b) polymerising a monomer optionally together with one or more comonomer(s) in a polymerisation zone,
(c) separating the obtained polyolefin from the unreacted products and recovering the separated polyolefin in a recovery zone,
wherein, in a) above, the compressor lubricant comprises a mineral oil.

2. The polymer composition according to claim 1, wherein the polymer composition has an electric conductivity of 0.48×10$^{-15}$ S/m or less, preferably 0.40×10$^{-15}$ S/m or less, preferably 0.38×10$^{-15}$ S/m or less, when measured according to DC conductivity method using a tape sample consisting of the polymer composition, as described under "Determination Methods".

3. The polymer composition according to claim 1, wherein the polyolefin of the polymer composition has an electric conductivity of 0.50×10$^{-15}$ S/m or less, preferably of 0.48×10$^{-15}$ S/m or less, preferably 0.40×10$^{-15}$ S/m or less, preferably of 0.38×10$^{-15}$ S/m or less, when measured according to DC conductivity method using a tape sample consisting of the polyolefin polymer, as described under "Determination Methods".

4. The polymer composition according to claim 1, wherein the polyolefin is a LDPE homopolymer or LDPE copolymer of ethylene with one or more non-polar comonomer(s).

5. The polymer composition according to claim 1, wherein the polyolefin is a LDPE homopolymer or LDPE copolymer of ethylene with a polyunsaturated comonomer and optionally with another comonomer.

6. The polymer composition according to claim 1, comprising 80 to 100 wt % of the polyolefin.

7. The polymer composition according to claim 1, wherein the polyolefin is the only polymer component in the composition.

8. The polymer composition according to claim 1 which is crosslinked.

9. A process for producing a polyolefin having an electric conductivity of $0.50 \times 10^{-15}$ S/m or less, preferably of $0.48 \times 10^{-15}$ S/m or less which is a low density polyethylene (LDPE) selected from a LDPE homopolymer or LDPE copolymer of ethylene with one or more comonomer(s), which LDPE homopolymer or LDPE copolymer of ethylene may optionally be unsaturated,
wherein the polyolefin is produced in a high pressure process comprising:
(a) compressing one or more monomer(s) under pressure in a compressor, wherein a compressor lubricant is used for lubrication,
(b) polymerising a monomer optionally together with one or more comonomer(s) in a polymerisation zone,
(c) separating the obtained polyolefin from the unreacted products and recovering the separated polyolefin in a recovery zone,
wherein, in a) above, the compressor lubricant comprises a mineral oil.

10. The process according to claim 9, wherein the polymerisation b) above is operated at a pressure up to 4000 bar, preferably from 700 to 4000 bar, and at a temperature of up to 400° C., preferably from 80 to 350° C.

11. A power cable comprising a conductor surrounded by one or more layers, wherein at least one of said layer(s) comprises a polymer composition comprising a polyolefin, wherein the polymer composition has an electric conductivity of $0.50 \times 10^{-15}$ S/m or less, when measured according to DC conductivity method using a tape sample consisting of the polymer composition as described under "Determination Methods";
wherein the polyolefin is a low density polyethylene (LDPE) homopolymer which may optionally be unsaturated, and wherein the polyolefin is produced in a high pressure process comprising:
(a) compressing one or more monomer(s) under pressure in a compressor, wherein a compressor lubricant is used for lubrication,
(b) polymerising a monomer optionally together with one or more comonomer(s) in a polymerisation zone,
(c) separating the obtained polyolefin from the unreacted products and recovering the separated polyolefin in a recovery zone, wherein, in a) above, the compressor lubricant comprises a mineral oil.

12. The power cable of claim 11, comprising at least an inner semiconductive layer, an insulation layer and an outer semiconductive layer, in that order, wherein the polymer composition is present in the insulation layer.

13. The power cable of claim 11, wherein the polyolefin of the polymer composition has an electric conductivity of $0.50 \times 10^{-15}$ S/m or less, preferably of $0.48 \times 10^{-15}$ S/m or less, preferably $0.40 \times 10^{-15}$ S/m or less, preferably $0.38 \times 10^{-15}$ S/m or less, when measured according to DC conductivity method using a tape sample consisting of the polyolefin polymer as described under "Determination Methods".

14. The power cable of claim 11 which is a direct current (DC) power cable.

15. The power cable of claim 11 in which the polymer composition is crosslinked.

16. A process for producing a power cable, comprising:
producing a polyolefin having an electric conductivity of $0.50 \times 10^{-15}$ S/m or less, preferably of $0.48 \times 10^{-15}$ S/m or less which is a low density polyethylene (LDPE) homopolymer which may optionally be unsaturated,
wherein the polyolefin is produced in a high pressure process comprising:
(a) compressing one or more monomer(s) under pressure in a compressor, wherein a compressor lubricant is used for lubrication;
(b) polymerising a monomer optionally together with one or more comonomer(s) in a polymerisation zone; and
(c) separating the obtained polyolefin from the unreacted products and recovering the separated polyolefin in a recovery zone,
wherein, in a) above, the compressor lubricant comprises a mineral oil;
applying, preferably by (co)extrusion, one or more layer(s) on a conductor wherein at least one layer comprises a polymer composition comprising said polyolefin;
and optionally crosslinking at least the obtained layer of the cable.

17. The process of claim 16, wherein the polymer composition has an electric conductivity of $0.50 \times 10^{-15}$ S/m or less, when measured according to DC conductivity method using a tape sample consisting of the polymer composition as described under "Determination Methods".

* * * * *